Dec. 8, 1931.  R. T. POLLOCK  1,835,809
PROCESS AND APPARATUS FOR CRACKING OIL
Original Filed Dec. 2, 1920
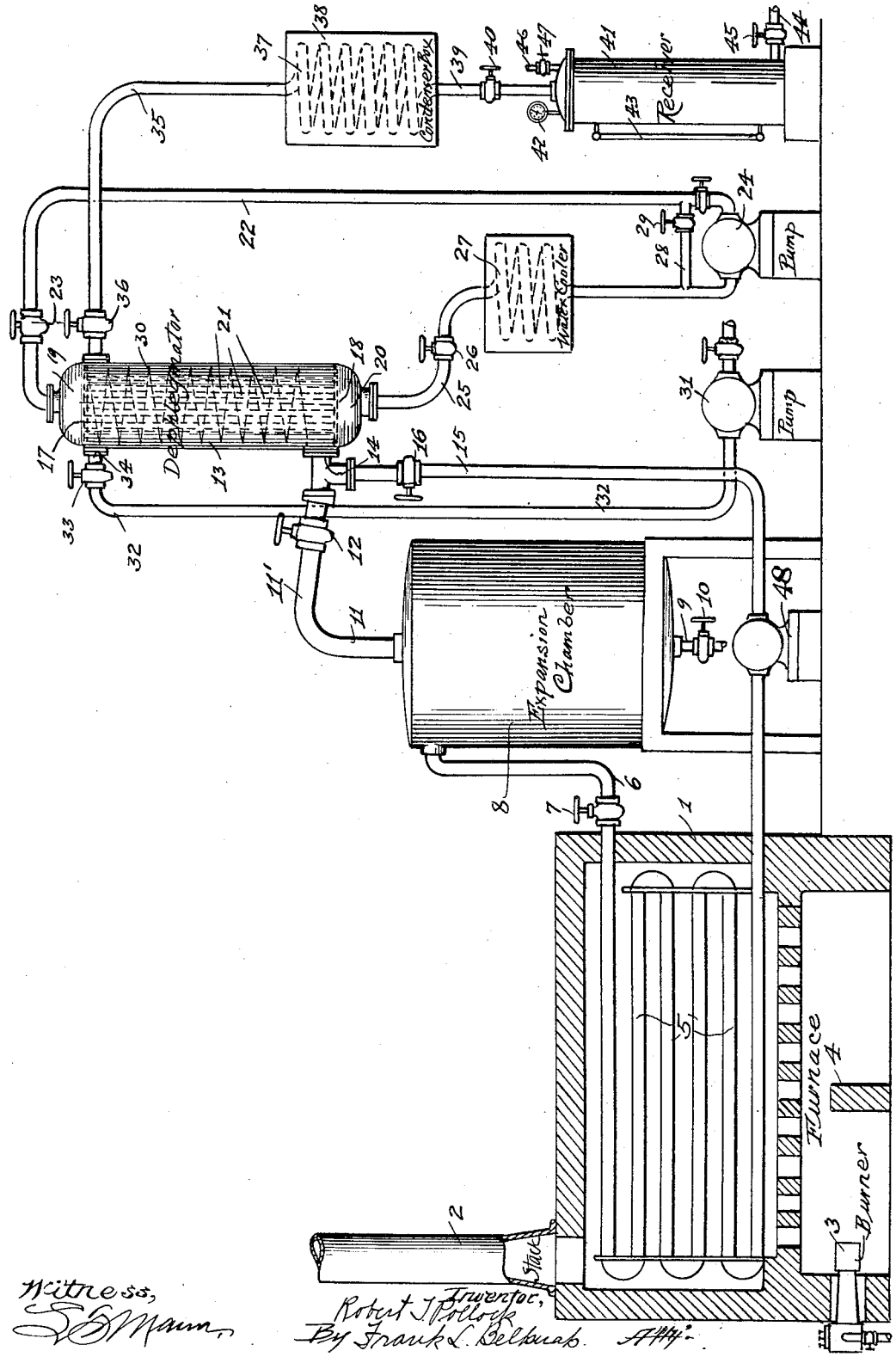

Patented Dec. 8, 1931

1,835,809

UNITED STATES PATENT OFFICE

ROBERT T. POLLOCK, OF NEW YORK, N. Y., ASSIGNOR TO UNIVERSAL OIL PRODUCTS COMPANY, OF CHICAGO, ILLINOIS, A CORPORATION OF SOUTH DAKOTA

PROCESS AND APPARATUS FOR CRACKING OIL

Application filed December 2, 1920, Serial No. 427,874. Renewed November 21, 1927.

This invention relates to improvements in process of and apparatus for cracking oil and refers more particularly to the manner of controlling the dephlegmation of the cracked vapors. In the present invention, the raw oil is brought directly into contact with the vapors in the dephlegmator which, of course, tends to have a reflux condensing action on the hotter vapors. Inasmuch as more raw oil will be required, however, to condense the vapors than can be supplied by the charging stock required for the system, I have provided, as a feature of the invention, novel means for regulating positively the temperature of the dephlegmator independently of the raw oil.

The single figure in the drawing is a somewhat diagrammatic view, partly in cross section and partly in side elevation, of an apparatus suitable for carrying out my process.

Referring in detail to this drawing, 1 designates a furnace, having stack 2, burner 3 and bridge wall 4. In the furnace is mounted the heating coil 5, as for example, a continuous coil of 4″ to 6″ pipe. The outlet side of the coil is connected by transfer line 6 having throttle valve 7, to an expansion chamber or vapor chamber 8 located outside of the fire zone. This vapor chamber 8 is provided with a residue draw off pipe 9 having throttle valve 10. The upper part of the vapor chamber is connected by pipe 11 having throttle valve 12 to the lower part of a dephlegmator 13. As shown, the pipe 11 is provided with a downwardly extending branch 11′, thus preventing the reflux condensate from flowing back into the vapor chamber. The dephlegmator is also provided with a nipple 14, at its lower end, connected to feed line 15 having throttle control valve 16.

The dephlegmator may take the form of a vertical drum or reservoir and is provided with opposed partition members 17 and 18 forming water chambers 19 and 20. These chambers are connected by means of water tubes 21 fixed in the partitions and open at either end so as to permit the water to flow from the chamber 19 through the tubes 21 into the chamber 20. The chamber 19 is connected to feed line 22 having throttle valve 23 leading to the water pump 24. The lower end of the chamber 20 is in turn connected by pipe 25 having throttle valve 26, to a water cooler 27. The lower end of the cooler coil is in turn connected to the pump. A bypass line 28 having a throttle valve 29 is also provided. The arrangement is such that water may be circulated continuously during the operation of the process through the tubes 21 and maintaining the dephlegmator at a predetermined temperature at all times, as for example, 400 degrees F. Surrounding the tubes 21 is a helical baffle member 30 which is prferably slightly spaced away from the tubes and wall of the drum. Raw oil is delivered by feed pump 31 through feed line 32 controlled by valve 33 to the nozzle 34 leading from the upper part of the dephlegmator just below the upper partition 17. The uncondensed vapors and uncondensable gases pass out of the upper part of the dephlegmator through pipe 35 controlled by throttle valve 36 to condenser coil 37 seated in condenser box 38. The lower end of the coil 37 is connected by pipe 39 having throttle valve 40 to the upper part of receiver 41. This receiver 41 is provided with pressure gauge 42, liquid level gauge 43, liquid drawoff pipe 44 controlled by throttle valve 45 and gas outlet pipe 46 controlled by throttle valve 47.

The process is operated as follows: Raw oil, as for example, fuel oil is fed through the line 32 into the oil chamber of the dephlegmator and thence passes through the feed line 15 to the heating coil. In the heating coil it may be heated to a temperature of say, 750 degrees F. and while still in liquid phase delivered to the expansion chamber. Here vaporization takes place, the precipitated carbon and unvaporized residue drawn off while the vapors pass out through the gooseneck into the lower part of the dephlegmator. As the vapors rise in the dephlegmator, they are compelled to pass along the baffle and are subjected not only to the cooling action of the incoming raw oil, but also to the cooling action of the water or other fluid in the tubes 21. The reflux condensate will mix with the preheated raw oil and be returned to the heating tubes. The uncondensable gases and uncondensed vapors will pass to the condenser and thence to the receiver.

A pressure of 150 pounds to the square inch may be maintained on the entire system during the operation of the process.

The process may also be operated under a differential pressure, as for example, 200 pounds on the heating coil, 150 pounds on the expansion chamber, 100 pounds on the dephlegmator, 75 pounds on the water condenser and 50 pounds on the receiver. In such cases a pump 48, shown in dotted lines, may be interposed in the feed line 15 in order to force the charging stock into the heating coil. The process may also be operated by having the heating coil and vapor chamber under 150 pounds pressure and the rest of the apparatus at atmospheric pressure. In such case the pump 48 should be used.

In any case, it is to be noted that the dephlegmator also acts as a heat interchanger and that the cold raw oil coming into direct contact with the hot vapors is the first and primary means for condensing the heavier vapors. The water, however, acts as a secondary means and accomplishes two purposes. First, it will provide the necessary reflux condensation in the event that the raw oil does not, and in most cases such additional cooling effect will be necessary. Second, the water can be sent through the dephlegmator at any desired temperature and in any desired quantity so that it acts as a regulating fluid for maintaining at all times a definite temperature in the dephlegmator.

The apparatus here shown is also believed to be novel.

I claim as my invention:

In an apparatus for treating hydrocarbon oil, the combination with means for maintaining cracking conditions of heat and superatmospheric pressure to cause substantial vaporization, a dephlegmator for receiving said vapors having upper and lower compartments divided by partition members to form a closed chamber between the partitions, closed passageways within this chamber connecting the partition elements, means for introducing to and withdrawing vapors from the closed chamber, separate means for introducing to the closed chamber incoming charging stock to mingle in direct physical contact with the vapors and condense the heavier portions thereof, means for withdrawing the raw oil and reflux condensate from the closed chamber, means for simultaneously introducing a second cooling medium to and withdrawing same from the dephlegmator out of direct physical contact with the vapors and incoming charging stock.

ROBERT T. POLLOCK.